3,232,953
CERTAIN TETRAHYDROBENZINDOLE
            DERIVATIVES
Norbert Gruenfeld, New York, N.Y., assignor to Geigy
   Chemical Corporation, Greenburgh, N.Y., a corporation of Delaware
No Drawing. Filed Dec. 31, 1962, Ser. No. 248,223
            8 Claims. (Cl. 260—319)

This invention relates to certain novel benzindole derivatives, which possess valuable pharmacological properties and are useful as pharmaceutical agents. This invention also pertains to processes for their manufacture.

More particularly, this invention resides in 2-carboxy, 2-carbalkoxy and 2-carboxamido derivatives of 3,3a,4,5-tetrahydro-2H-benz[g]indoles which may be represented by the following structural formula:

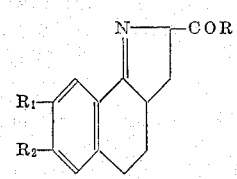

In this formula

R represents hydroxy, lower alkoxy, amino, lower monoalkylamino; and
$R_1$ and $R_2$ denote hydrogen, halogen (particularly, chlorine and bromine), lower alkyl, and lower alkoxy.

The term "lower alkyl" as used herein per se and as included in the term "lower alkoxy" means saturated monovalent aliphatic radicals of the general formula —$C_mH_{2m+1}$ wherein $m$ designates an integer of less than six and is inclusive of both straight-chain and branched-chain radicals, such as, methyl, ethyl, n-propyl, iso-propyl, n-butyl, amyl, etc.

The compounds of this invention may be conveniently synthesized by a reaction involving the cyclization of a 2 - [(di(lower)alkyl acylamidomalonate)methyl] - 1-tetralone, yielding the 2-carboxy derivative of 3,3a,4,5-tetrahydro-2H-benz[g]indole which, if desired, can be readily converted to the corresponding ester and amide.

More specifically, the subject compounds may be made by the following synthesis: acid addition salts of 3,3a,4,5-tetrahydro - 2H - benz[g]indole-2-carboxylic acids are formed (1) by refluxing a 2-[(di(lower)alkyl acylamidomalonate)methyl]-1-tetralone with mineral acid, such as, hydrohalic (hydrochloric or hydrobromic) or sulfuric acid. The treatment with mineral acid causes hydrolysis, cyclization and mono-decarboxylation. These carboxy derivatives can be esterified (2) by any of the known esterification procedures, as for example, by refluxing with a lower alkanol and sulfuric acid. The ester obtained, namely lower alkyl 3,3a,4,5-tetrahydro-2H-benz[g]indole-2-carboxylate, can be converted (3) to corresponding amides, i.e. 3,3a,4,5-tetrahydro-2H-benz[g]indole-2-carboxamides by a well known procedure which involves aminolysis.

The synthesis of these compounds may be graphically illustrated by the following equations:

(1) 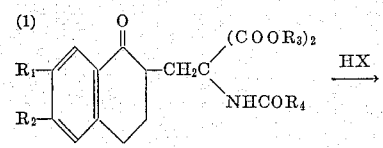

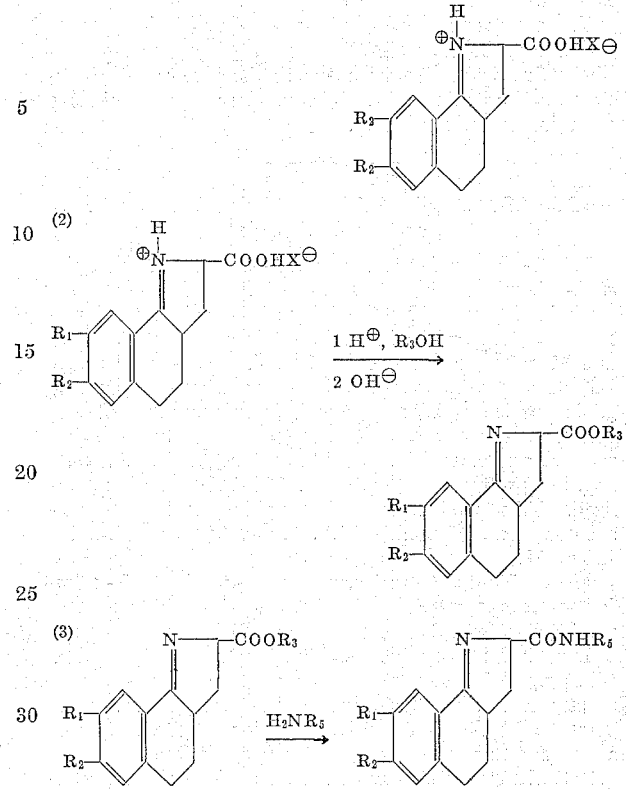

The symbols $R_1$ and $R_2$ in the above formulae have the significance ascribed to them hereinabove; X is a halide or sulfate anion, $R_3$ stands for lower alkyl, $R_4$ is hydrogen, lower alkyl or aryl(lower)alkoxy and $NHR_5$ represents amino and lower alkylamino.

The starting materials, namely 2-[(di(lower)alkyl-acylamidomalonate)methyl]-1-tetralones can be synthesized from the corresponding 1-tetralones which are either commercially available or readily obtainable in accordance with standard procedures. For example, 6,7-dimethoxy-1-tetralone yields via a Mannich reaction with paraformaldehyde and dimethylamine hydrochloride, 2-(dimethylaminomethyl)-6,7-dimethoxy-1-tetralone hydrochloride. This affords the desired starting material, 2-[(diethyl acetamidomalonate)methyl] - 6,7 - dimethoxy-1-tetralone, when condensed with diethyl acetamidomalonate.

The present invention comprehends not only the above-described derivatives of 3,3a,4,5-tetrahydro-2H-benz[g] indoles in their free base form, but it also includes pharmaceutically acceptable non-toxic acid addition salts which may be formed from said compounds in accordance with conventional practice, by using appropriate inorganic and organic acids, such as hydrohalic acids, especially hydrochloric and hydrobromic acids, sulfuric, methanesulfonic and phosphoric acids as well as acetic, lactic, succinic, malic, aconitic, phthalic and tartaric acids.

As mentioned above, the subject compounds possess valuable pharmacological properties; they have been found to possess adrenolytic, CNS depressant and, particularly, analgesic properties and can therefore be characterized as adrenolytic CNS depressant and analgetic agents.

Merely by way of illustration, the compound of Example 6, 7,8-dimethoxy-3,3a,4,5-tetrahydro-2H-benz[g] indole-2-carboxamide, increased the pain-threshold in the tailflick test by 37% at a dose of 500 mg./kg., p.o.; at a dose of 250 mg./kg., p.o., it reduced the number of stretches in the acetic acid analgesic test by 56%; and in Haffner's test it decreased the number of bites at a dose of 500 mg/kg. p.o. by 23% of the mice and at a dose of 250 mg./kg. p.o. by 18% of the mice.

These new compounds and the methods for their preparation may be exemplified more fully by the following illustrative examples; the scope of the invention is however not limited thereto. The temperatures therein are given in degrees centigrade.

EXAMPLE 1

*3,3a,4,5-tetrahydro-2H-benz[g]indole-2-carboxylic acid hydrochloride*

(a) *2 - dimethylaminomethyl - 1 - tetralone hydrochloride.*—A mixture of 1-tetralone (43.8 g., 0.3 mole), dimethylamine hydrochloride (27 g., 0.33 mole), paraformaldehyde (13.5 g., 0.45 mole), absolute ethanol (90 ml.) and hydrochloric acid (conc. 1.5 ml.) was heated under reflux for two hours. Additional paraformaldehyde (9.0 g., 0.3 mole) was added and heating under reflux was continued for two additional hours. The hot reaction mixture was poured into boiling acetone (600 ml.). The reaction product (44.7 g., M.P. 156–158° dec.) crystallized. This product was recrystallized from ethanol-acetone (1:5, 600 ml.), M.P. 154–156° dec.; M.P. lit. 158–159°.

(b) *[(Diethylacetamidomalonate) - methyl] - 1 - tetralone.*—Compound (a) (30.0 g., 0.125 mole) was suspended in absolute ethanol (125 ml., dried by distillation over sodium and diethyl succinate), and dimethyl sulfate (19.0 g., 0.15 mole) was added dropwise at room temperature. The reaction mixture was stirred at room temperature for two hours and a solution resulted. Subsequent addition of diethyl acetamidomalonate (21.5 g., 0.10 mole) suspended in sodium ethoxide solution (prepared by dissolving 0.20 mole of sodium in 125 ml. of absolute ethanol) resulted in a slightly exothermic reaction. The mixture was stirred at room temperature for 18 hours. The reaction mixture was then added to ice (650 g.). The reaction product (32.7 g., M.P. 100–104°) crystallized. Recrystallization from isopropanol (50 ml.) yielded the desired compound (25.7 g., M.P. 107–109°). Further recrystallization gave pure material, M.P. 108–110°. Ultraviolet spectrum:

$$\lambda_{max.}^{MeOH}\ 245\ m\mu\ (\epsilon,\ 12,000)$$

(c) *3,3a,4,5-tetrahydro-2H-benz[g]indole-2-carboxylic acid hydrochloride.*—A suspension of compound (b) (22.5 g., 0.06 mole) in 3 N hydrochloric acid (150 ml.) was heated under reflux for ten hours. The resulting solution was filtered, evaporated to dryness under reduced pressure. Acetone (100 ml.) was added to the residue; the crystalline reaction product was filtered off (14.29 g., M.P. 225–227° dec.), and was directly esterified.

EXAMPLE 2

*Methyl 3,3a,4,5-tetrahydro-2H-benz[g]indole-2-carboxylate hydrochloride*

The compound of Example 1 (12.6 g., 0.05 mole) was dissolved in absolute methanol (125 ml.). Sulfuric acid (reagent grade, 12.5 ml.) was added and the mixture was heated under reflux for three hours. Methanol was removed by distillation under reduced pressure and the residue was treated while cooling in an ice bath with saturated sodium carbonate solution (to pH 9). The mixture was extracted with chloroform (3×150 ml.); the combined chloroform extract was washed with water, dried over sodium sulfate and evaporated to dryness. The oily residue (11.9 g.) was dissolved in isopropanol (30 ml.) and ethanolic HCl (9.9 N, 6 ml.) was added. The hydrochloride salt crystallized (11.3 g., M.P. 184° dec.) and was twice recrystallized from ethanol-isopropanol (1:5, 60 ml.) to give the desired compound (6.6 g., M.P. 184° dec.). Ultraviolet spectrum:

$$\lambda_{max.}^{MeOH}\ 249\ m\mu\ (\epsilon,\ 12,000)$$

*Analysis.*—For $C_{14}H_{16}ClNO_2$: Calcd.: C, 63.27; H, 6.07; N, 5.27; Cl, 13.34. Found: C, 63.13; H, 6.20; N, 5.34; Cl, 13.16.

EXAMPLE 3

*3,3a,4,5-tetrahydro-2H-benz[g]indole-2-carboxamide*

Methyl 3,3a,4,5-tetrahydro - 2H - benz[g]-indole-2-carboxylate hydrochloride (26.6 g., 0.1 mole) was dissolved in water (75 ml.). The solution was neutralized to pH 8–9 with saturated sodium carbonate solution and extracted with chloroform (3×100 ml.). The chloroform extract was washed with water, dried over sodium sulfate and evaporated to dryness to yield methyl 3,3a,4,5-tetrahydro-2H-benz[g]-indole-2-carboxylate (24.1 g.). A portion (6.5 g., 0.028 mole) was dissolved in methanol (100 ml.), the solution was saturated with ammonia and stored at room temperature in a pressure bottle for one week. The solution was evaporated to dryness, the residue was crystallized from isopropanol (ca. 50 ml.); yield, 4.6 g., M.P. 140–158°. Two recrystallizations from isopropanol yielded the desired compound (3.1 g., M.P. 138–158°). Ultraviolet spectrum:

$$\lambda_{max.}^{MeOH}\ 249\ m\mu\ (\epsilon,\ 15,000)$$

*Analysis.*—For $C_{13}H_{14}N_2O$: Calcd.: C, 72.87; H, 6.59; N, 13.08. Found: C, 72.69; H, 6.71; N, 13.03.

Treatment of methyl 3,3a,4,5-tetrahydro-2H-benz[g]indole-2-carboxylate with methylamine in a similar manner gives the corresponding 3,3a,4,5-tetrahydro-2H-benz[g]indole-2-(N-methyl)-carboxamide.

EXAMPLE 4

*7,8-dimethoxy-3,3a,4,5-tetrahydro-2H-benz[g]indole-2-carboxylic acid hydrochloride*

(a) *2-(dimethylaminomethyl)-6,7-dimethoxy - 1-tetralone hydrochloride.*—A mixture of 6,7-dimethoxy-1-tetralone (10.3 g., 0.05 mole), (prepared in accordance with R. D. Haworth and C. R. Mavin, J. Chem. Soc. 1932, 1485), dimethylamine hydrochloride (4.5 g., 0.055 mole), paraformaldehyde (2.25 g., 0.075 mole), absolute ethanol (15 ml.) and hydrochloric acid (conc., 0.75 ml.) was heated under reflux for two hours. Additional paraformaldehyde (1.5 g., 0.05 mole) was added and heating under reflux was continued for two additional hours. The hot reaction mixture was poured into boiling acetone (50 ml.). The reaction product (13.1 g., M.P. 191–192° dec.) crystallized. Two recrystallizations from ethanol:acetone (1:2, 150 ml.) gave the desired compound (6.8 g., M.P. 191–192° dec.). Ultraviolet spectrum:

$$\lambda_{max.}^{MeOH}\ 231\ m\mu\ (\epsilon,\ 18,000);\ 274\ m\mu\ (\epsilon,\ 12,000);\ 312\ m\mu\ (\epsilon,\ 8,500)$$

(b) *2-[(diethyl acetamidomalonate)-methyl]-6,7-dimethoxy - 1 - tetralone.*—2 - dimethylaminomethyl - 6,7-dimethoxy-tetralone hydrochloride (30 g., 0.1 mole) was suspended in absolute ethanol (150 ml. dried by distillation over Na and diethyl succinate), and dimethyl sulfate (11.4 ml., 0.12 mole) was added dropwise at room temperature. The reaction mixture was stirred at room temperature overnight. Subsequent addition of diethyl acetamidomalonate (17.2 g., 0.08 mole) suspended in sodium ethoxide solution (prepared by dissolving 0.16 mole of sodium in 100 ml. of absolute ethanol) resulted in a slightly exothermic reaction. The reaction mixture was stirred at room temperature for 18, and was then added to ice (600 g.). The reaction product (29.4 g., M.P. 126–128°) crystallized. Two recrystallizations of a small batch (4.4 g.) from isopropanol (15 ml.) gave pure material (3.3 g., M.P. 128–130°). Ultraviolet spectrum:

$\lambda_{max.}^{MeOH}$ 229 mµ (ε, 18,000); 270 mµ (ε, 12,000); 308 mµ (ε, 7,800)

(c) *7,8 - dimethoxy - 3,3a,4,5 - tetrahydro - 2H - benz [g]indole-2-carboxylic acid hydrochloride.*—A suspension of the compound under (b) above (25 g., 0.057 mole) in 3 N hydrochloric acid (140 ml.) was heated under reflux for 6 hours. The resulting solution was treated with charcoal, filtered and evaporated to dryness under reduced pressure. Acetone (150 ml.) was added to the residue. The reaction product (14 g., M.P. 247–248° dec.) crystallized; a second crop weighed 5.1 g.; M.P. 236–237° dec. The crude product was directly esterified.

7-bromo-1-tetralone, 7-methyl-1-tetralone and 6,7-dimethyl-1-tetralone give, when subjected to the above described sequence of reactions, 8-bromo-3,3a,4,5-tetrahydro-2H-benz[g]-indole-2-carboxylic acid hydrochloride, 8 - methyl - 3,3a,4,5 - tetrahydro - 2H - benz[g]indole-2-carboxylic acid hydrochloride and 7,8-dimethyl-3,3a,4,5 - tetrahydro - 2H - benz[g]indole - 2 - carboxylic acid hydrochloride, respectively.

EXAMPLE 5

*Methyl 7,8-dimethoxy-3,3a,4,5-tetrahydro-2H-benz [g]indole-2-carboxylate*

The compound of Example 4 (3.1 g., 0.01 mole) was dissolved in absolute methanol (30 ml.); sulfuric acid (reagent grade, 3 ml.) was added and the mixture was heated under reflux for three hours. Methanol was removed by distillation under reduced pressure and the residue was treated while cooling in an ice bath with saturated sodium carbonate solution (to pH 9). The crystalline reaction product (2.7 g., M.P. 152–156°) was filtered off. Two recrystallizations from isopropanol yielded pure material (1.6 g., M.P. 154–157°). Ultraviolet spectrum:

$\lambda_{max.}^{MeOH}$ 308 mµ (ε, 9,000); 269 mµ (ε, 14,000); 228 mµ (ε, 13,000)

*Analysis.*—For $C_{16}H_{19}NO_4$: Calcd.: C, 66.42; H, 6.62; N, 4.84. Found: C, 66.51; H, 6.78; N, 4.88.

EXAMPLE 6

*7,8-dimethoxy-3,3a,4,5-tetrahydro-2H-benz[g] indole-2-carboxamide*

Methyl 7,8 - dimethoxy - 3,3a,4,5 - tetrahydro - 2H-benz[g]-indole-2-carboxylate (5.8 g., 0.02 mole) was suspended in methanol (100 ml.). The suspension was saturated with ammonia and stored at room temperature in a pressure bottle for ten days. Methanol was evaporated under reduced pressure and the residue (5.5 g.) was twice recrystallized from methanol (200 ml.) to yield the desired compound (2.6 g., M.P. 203–210° dec.). Ultraviolet spectrum:

$\lambda_{max.}^{MeOH}$ 307 mµ (ε, 10,400); 268 mµ (ε, 16,000); 226 mµ (ε, 16,000)

*Analysis.*—For $C_{15}H_{18}N_2O_3$: Calcd.: C, 65.67; H, 6.61; N, 10.21. Found: C, 65.82; H, 6.66; N, 10.06.

What is claimed is:
1. A compound selected from the group consisting of

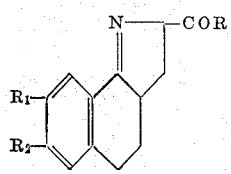

wherein

R is a member selected from the group consisting of hydroxy, lower alkoxy, amino and lower mono-alkylamino; and $R_1$ and $R_2$ are chosen from the group consisting of hydrogen, halogen, lower alkyl and lower alkoxy;

and pharmaceutically acceptable acid addition salts thereof.

2. 3,3a,4,5 - tetrahydro - 2H - benz[g]indole - 2 - carboxylic acid.

3. Methyl 3,3a,4,5 - tetrahydro - 2H - benz[g]indole-2-carboxylate.

4. 7,8 - dimethoxy - 3,3a,4,5 - tetrahydro - 2H - benz [g]indole-2-carboxylic acid.

5. Methyl 7,8 - dimethoxy - 3,3a,4,5 - tetrahydro - 2H-benz[g]indole-2-carboxylate.

6. 3,3a,4,5 - tetrahydro - 2H - benz[g]indole - 2 - carboxamide.

7. 7,8 - dimethoxy - 3,3a,4,5 - tetrahydro - 2H - benz [g]indole-2-carboxamide.

8. A process for making a compound of the formula

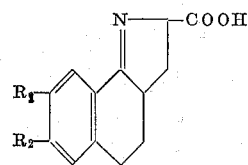

wherein $R_1$ and $R_2$ are selected from the group consisting of hydrogen, halogen, lower alkyl and lower alkoxy and pharmaceutically acceptable acid addition salts thereof;

which comprises refluxing with mineral acid a compound of the formula

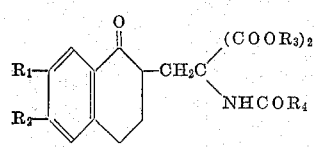

wherein $R_1$ and $R_2$ have the same meaning indicated above, $R_3$ is lower alkyl and $R_4$ is selected from the group consisting of hydrogen and lower alkyl.

References Cited by the Examiner

Chemical Abstracts, vol. 33, pp. 587 (1939).
Cram et al.: Organic Chemistry, McGraw-Hill Book Company, Inc., New York, 1959, pages 25–26.
Rose et al.: Ed., The Condensed Chemical Dictionary, Reinhold Publishing Corp., New York, 1956, page 114.
Rydon et al.: J. Chem. Soc., pp. 2462–7 (1951).

NICHOLAS S. RIZZO, *Primary Examiner.*

IRVING MARCUS, *Examiner.*